United States Patent
Fujinaka

(10) Patent No.: US 10,317,697 B2
(45) Date of Patent: Jun. 11, 2019

(54) ACTUATOR AND LENS BARREL WITH ACTUATOR

(71) Applicant: Panasonic Intellectual Property Management Co., Ltd., Osaka (JP)

(72) Inventor: Hiroyasu Fujinaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 438 days.

(21) Appl. No.: 14/932,866

(22) Filed: Nov. 4, 2015

(65) Prior Publication Data
US 2016/0054580 A1 Feb. 25, 2016

Related U.S. Application Data

(63) Continuation of application No. PCT/JP2014/002775, filed on May 27, 2014.

(30) Foreign Application Priority Data

Jun. 25, 2013 (JP) .................................. 2013-132234

(51) Int. Cl.
*H02K 41/03* (2006.01)
*G02B 7/04* (2006.01)
*G02B 27/64* (2006.01)
*G03B 5/00* (2006.01)
(Continued)

(52) U.S. Cl.
CPC ........... *G02B 27/646* (2013.01); *G02B 7/023* (2013.01); *G02B 7/04* (2013.01); *G03B 5/00* (2013.01);
(Continued)

(58) Field of Classification Search
CPC .... H02K 41/0356; H02K 33/16; H02K 41/03; H02K 41/035; G03B 5/00; G02B 7/04;
(Continued)

(56) References Cited

U.S. PATENT DOCUMENTS 5,175,457 A 12/1992 Vincent
6,112,028 A * 8/2000 Okada ..................... G03B 5/00
396/52
(Continued)

FOREIGN PATENT DOCUMENTS

JP 2006-003421 1/2006
JP 2008-237004 10/2008
(Continued)

OTHER PUBLICATIONS

International Search Report of PCT application No. PCT/JP2014/002775 dated Sep. 2, 2014.

*Primary Examiner* — Tran N Nguyen
(74) *Attorney, Agent, or Firm* — Wenderoth, Lind & Ponack, L.L.P.

(57) ABSTRACT

Provided is an actuator that increases thrust while reducing mass of a magnetic field generating member including a magnet and a yoke, compared to conventional actuators. An actuator in the present disclosure includes a magnetic field generating member having a multipole-magnetized magnet and a yoke disposed on a first surface of the multipole-magnetized magnet, and a coil member provided in a position confronting a second surface of the multipole-magnetized magnet. The yoke is formed of a member narrower in width than the first surface of the multipole-magnetized magnet.

5 Claims, 11 Drawing Sheets

(51) Int. Cl.
*G02B 7/02* (2006.01)
*H02K 33/16* (2006.01)
*H02K 41/035* (2006.01)

(52) U.S. Cl.
CPC ......... *H02K 33/16* (2013.01); *H02K 41/0356* (2013.01); *G03B 2205/0015* (2013.01); *G03B 2205/0069* (2013.01)

(58) Field of Classification Search
CPC .......... G02B 7/02; G02B 7/023; G02B 27/64; G02B 27/646; H04N 5/2254; H04N 5/2328
USPC ............................ 310/12.16, 12.24; 359/557
See application file for complete search history.

(56) References Cited

U.S. PATENT DOCUMENTS

| | | | | |
|---|---|---|---|---|
| 6,249,065 B1 * | 6/2001 | Oudet | ............... | H02K 33/16 310/12.19 |
| 6,631,042 B2 * | 10/2003 | Noguchi | ............... | G02B 27/646 348/E5.046 |
| 2002/0071189 A1 * | 6/2002 | Ohno | ............... | G11B 7/0933 359/813 |
| 2005/0276172 A1 | 12/2005 | Tsutsumi | | |
| 2007/0188868 A1 * | 8/2007 | Fujinaka | ............... | G02B 27/646 359/557 |
| 2008/0197720 A1 | 8/2008 | Matsumoto et al. | | |
| 2008/0203829 A1 | 8/2008 | Matsumoto et al. | | |
| 2008/0204174 A1 | 8/2008 | Ito et al. | | |
| 2011/0102613 A1 * | 5/2011 | Noguchi | ............... | G03B 5/00 348/208.11 |
| 2012/0120492 A1 * | 5/2012 | Sato | ............... | G02B 27/646 359/557 |
| 2012/0154912 A1 | 6/2012 | Shihoh | | |

FOREIGN PATENT DOCUMENTS

| | | |
|---|---|---|
| JP | 2009-065754 | 3/2009 |
| JP | 2011-242680 | 12/2011 |
| JP | 2012-133040 | 7/2012 |

* cited by examiner

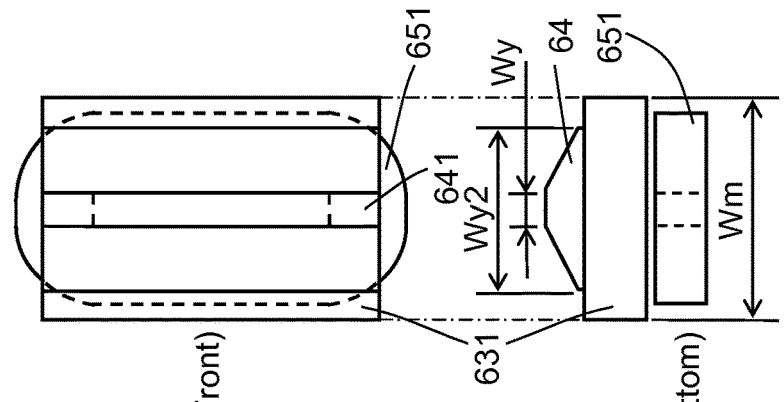
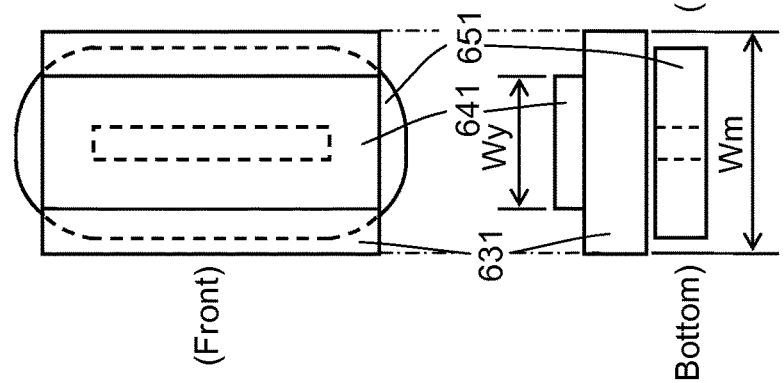
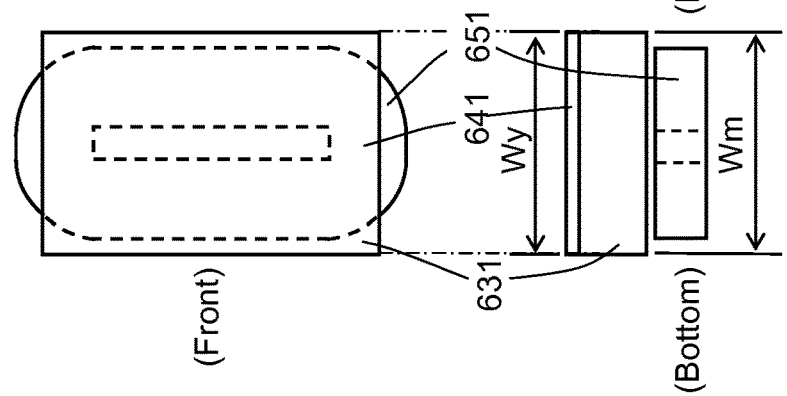
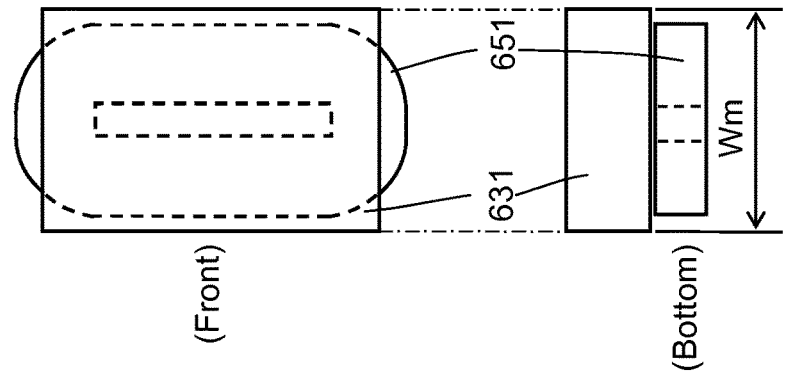

FIG. 7

| ITEM | (A)<br>MAGNET ONLY | (B)<br>UNIFORM-THICKNESS YOKE | (C)<br>NARROWER YOKE | (D)<br>PRESENT EMBODIMENT |
|---|---|---|---|---|
| THRUST | 0.144N | 0.147N | 0.152N | 0.156N |
| RATIO | - | 1.028 | 1.060 | 1.086 |

ACTUATOR AND LENS BARREL WITH ACTUATOR

BACKGROUND

1. Technical Field

The present disclosure relates to actuators including coils and magnets.

2. Description of the Related Art

PTL 1 discloses a voice coil motor for camera shake correction as an example of an actuator. The voice coil motor includes coils, permanent magnets, and yokes. As shown in FIG. 10 of PTL 1, a yoke provided in contact with a permanent magnet has a flat-plate shape.

CITATION LIST

Patent Literature

PTL 1: Unexamined Japanese Patent Publication No. 2011-242680

SUMMARY

The present disclosure provides an actuator that increases thrust while reducing mass of a magnetic field generating member including a magnet and a yoke, compared to conventional actuators.

The actuator in the present disclosure includes a magnetic field generating member having a multipole-magnetized magnet and a yoke disposed on a first surface of the multipole-magnetized magnet, and a coil member provided in a position confronting a second surface of the multipole-magnetized magnet. The yoke is formed of a member narrower in width than the first surface of the multipole-magnetized magnet.

The actuator in the present disclosure is an actuator that increases thrust while reducing mass of a magnetic field generating member including a magnet and a yoke.

BRIEF DESCRIPTION OF DRAWINGS

FIG. 6A is a schematic diagram illustrating comparison of actuator configurations (item (A) in FIG. 7);

FIG. 6B is a schematic diagram illustrating comparison of actuator configurations (item (B) in FIG. 7);

FIG. 6C is a schematic diagram illustrating comparison of actuator configurations (item (C) in FIG. 7);

FIG. 6D is a schematic diagram illustrating comparison of actuator configurations (item (D) in FIG. 7);

FIG. 7 is a diagram illustrating relationships between actuator configurations shown in FIGS. 6A to 6D and thrusts;

DETAILED DESCRIPTION OF THE PREFERRED EMBODIMENTS

Hereinafter, with reference to the drawings as appropriate, an exemplary embodiment will be described in detail. However, unnecessarily detailed description will not be given. For example, detailed description of well-known matters and redundant description of substantially identical configurations will not be given. This is to prevent the following description from being unnecessarily redundant, to facilitate understanding of those skilled in the art.

In order for those skilled in the art to fully understand the present disclosure, the inventors provide the accompanying drawings and the following description, which are not intended to limit a subject described in the claims.

First Exemplary Embodiment

With reference to FIGS. 1 to 10, image blur correction device 600 in a lens barrel provided with an actuator of the present disclosure will be described.

[1. Configuration of Image Blur Correction Device 600]

Figure 1:
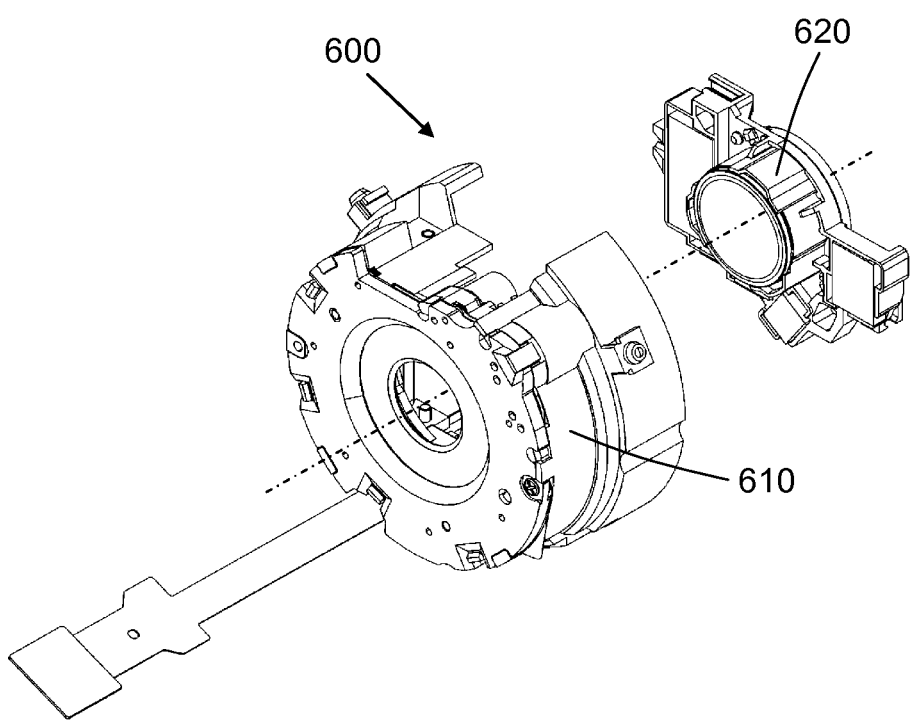
FIG. 1 is an exploded perspective view of image blur correction device 600 in a first exemplary embodiment.

FIG. 1 is an exploded perspective view of image blur correction device 600. Image blur correction device 600 is provided in a lens barrel of a digital still camera. Image blur correction device 600 includes shutter unit 610 provided with a correcting lens, and OIS unit 620. OIS is an abbreviation for optical image stabilizer.

Figure 2:
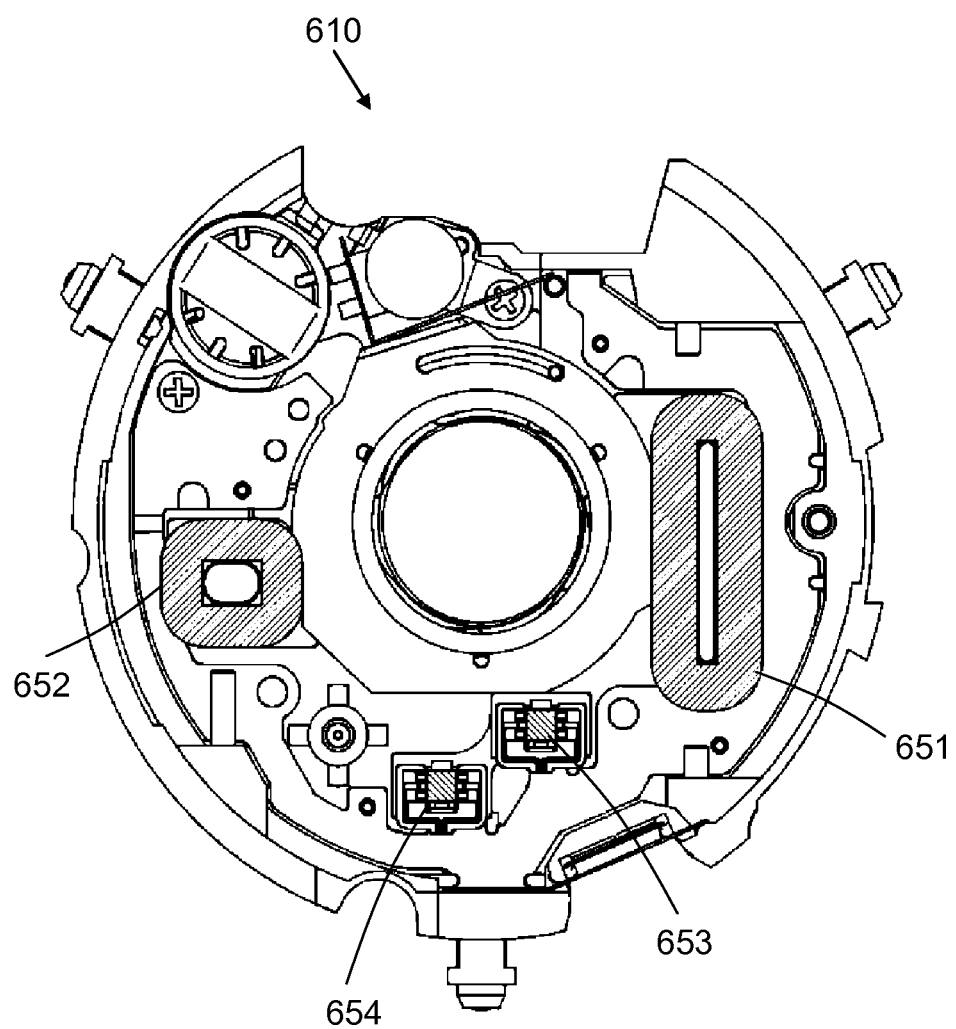
FIG. 2 is a back view of shutter unit 610 in the first exemplary embodiment.

FIG. 2 is a back view of shutter unit 610. Shutter unit 610 holds, on a back side (on a side where an imaging element not shown is provided), yaw coil 651, pitch coil 652, pitch position detection sensor 653, and yaw position detection sensor 654. Shutter unit 610 also holds shutter mechanical parts. Shutter unit 610 is engaged with a cam frame in a lens barrel not shown, and held movably in an optical axis direction in the cam frame.

Figure 3:
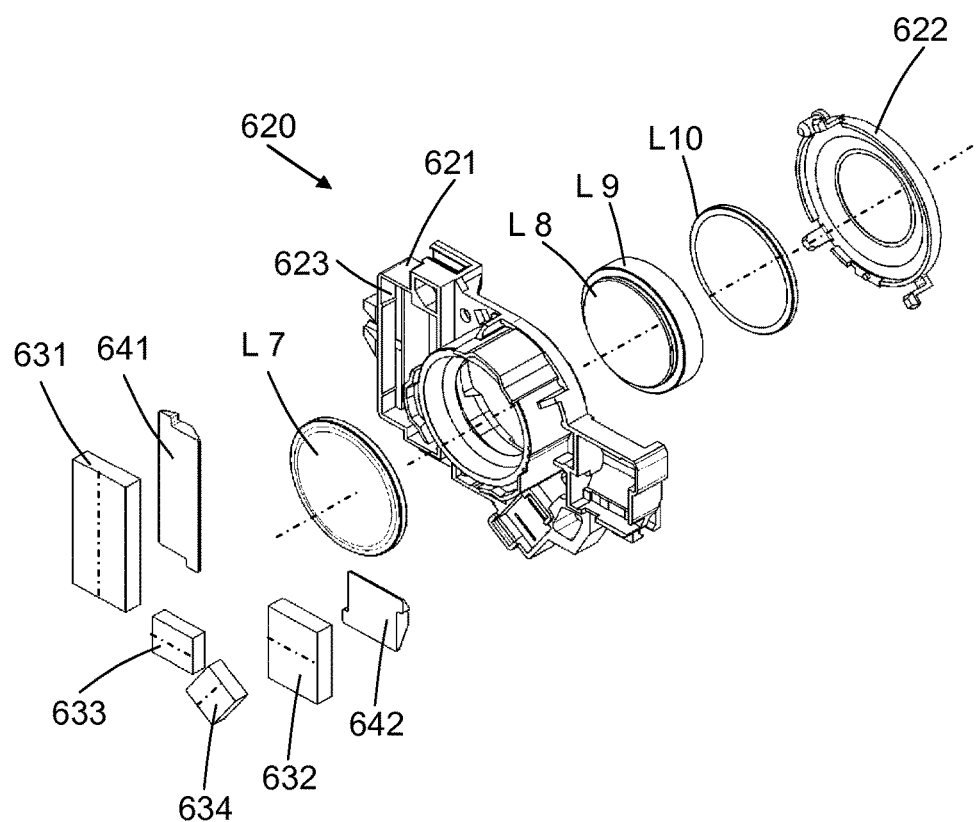
FIG. 3 is an exploded perspective view of OIS unit 620 in the first exemplary embodiment.

FIG. 3 is an exploded perspective view of OIS unit 620. OIS unit 620 includes correcting lenses L7 to L10, OIS frame 621, light shielding cap 622, yaw driving magnet 631, pitch driving magnet 632, pitch position detection magnet 633, yaw position detection magnet 634, yaw yoke 641, and pitch yoke 642. Correcting lenses L7 to L10 are fixed to OIS frame 621. Light shielding cap 622 is a light shielding cap that shields excessive light beams at a correcting lens outer peripheral portion, and is fixed to OIS frame 621.

Yaw driving magnet 631 and pitch driving magnet 632 are permanent magnets for driving entire OIS unit 620 with respect to shutter unit 610, and are each two-pole magnetized with a dot-dash line shown in FIG. 3 as a polarization line. Yaw driving magnet 631 and pitch driving magnet 632, to which yaw yoke 641 and pitch yoke 642 for increasing magnetic flux of the permanent magnets are magnetically attracted, respectively, are fixed by bonding to OIS frame 621. Yaw driving magnet 631 is disposed in a position confronting yaw coil 651, and pitch driving magnet 632 is disposed in a position confronting pitch coil 652.

Pitch position detection magnet 633 and yaw position detection magnet 634 are permanent magnets for detecting a position of OIS unit 620 with respect to shutter unit 610, and are magnetized with a dot-dash line shown in FIG. 3 as a polarization line. Pitch position detection magnet 633 and yaw position detection magnet 634 are fixed by bonding to OIS frame 621 in a positioned state. Pitch position detection magnet 633 is disposed in a position confronting pitch position detection sensor 653, and yaw position detection magnet 634 is disposed in a position confronting yaw position detection sensor 654.

Here, OIS unit 620 is restricted in movement in an optical axis direction with respect to shutter unit 610, and is supported movably in a plane perpendicular to an optical axis. Thus, when current flows through yaw coil 651 and pitch coil 652 in shutter unit 610, a force in a direction perpendicular to the optical axis is applied to yaw driving magnet 631 and pitch driving magnet 632, thereby moving entire OIS unit 620. Shutter unit 610 is an example of a fixed member, and OIS unit 620 is an example of a movable member.

Image blur correction device 600 is configured so that when OIS unit 620 is moved with respect to shutter unit 610, magnetic flux densities of pitch position detection sensor 653 and yaw position detection sensor 654 are changed, and based on the changes of the magnetic flux densities, a position of correcting lenses L7 to L10 is detected.

By controlling the position of correcting lenses L7 to L10 to cancel an image blur, depending on an amount of the image blur, the image blur is corrected.

[2. Configuration of Magnetic Field Generating Member (Yaw Driving Magnet 631 and Yaw Yoke 641)]

Figure 4:
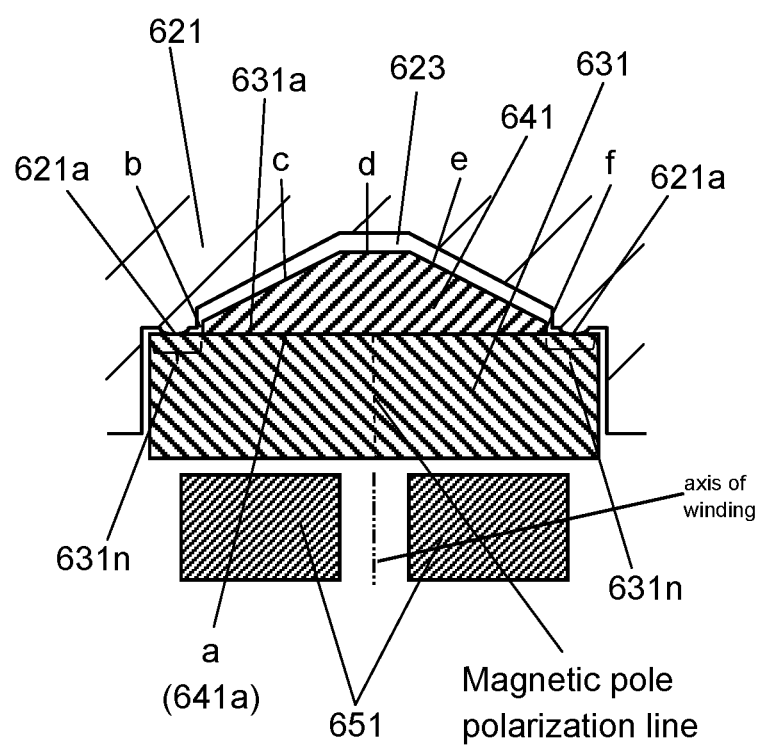
FIG. 4 is a cross-sectional view for illustrating a mounted configuration of yaw driving magnet 631 and yaw yoke 641 to OIS frame 621 in the first exemplary embodiment.

FIG. 4 is a cross-sectional view for illustrating a mounted configuration of yaw driving magnet 631 and yaw yoke 641 to OIS frame 621.

Yaw driving magnet 631 has a simple rectangular parallelepiped shape. As shown in FIG. 4, a cross-sectional shape of yaw yoke 641 is a hexagonal shape with six sides, bottom side a, left side b, left oblique side c, top side d, right oblique side e, and right side f. Bottom side a connects left side b and right side f, left oblique side c connects left side b and top side d, and right oblique side e connects top side d and right side f. Bottom side a and top side d are substantially in parallel with each other, and left side b and right side f are substantially in parallel with each other. A length of bottom side a is greater than a length of top side d, and lengths of left oblique side c and right oblique side e are substantially equal. Left side b and right side f are formed to facilitate forming of yaw yoke 641, but essentially need not be formed. Yaw yoke 641 contacts, at surface 641a of bottom side a, surface 631a of yaw driving magnet 631.

As shown in FIG. 4, yaw driving magnet 631 and yaw yoke 641 are disposed in recess 623 of OIS frame 621. A shape of recess 623 is a two-stage groove shape. Yaw driving magnet 631 is disposed in a first-stage groove, and yaw yoke 641 is disposed in a second-stage groove. Recess 623 of OIS frame 621 is provided with placement portions 621a. On placement portions 621a, yaw driving magnet 631 is directly placed. Specifically, yaw driving magnet 631 and yaw yoke 641 are fixed to OIS frame 621 with outer portions 631n of surface 631a of yaw driving magnet 631 in contact with yaw yoke 641 as a reference. Fixing with yaw driving magnet 631 as a reference is less affected by dimensional variation of yaw yoke 641 than fixing yaw driving magnet 631 to OIS frame 621 with yaw yoke 641 as a reference, thus increasing positional precision of yaw driving magnet 631 in the optical axis direction. A high positional precision of yaw driving magnet 631 allows a gap between yaw coil 651 and yaw driving magnet 631 to be designed narrower, thus enabling an improved thrust.

Figure 5:
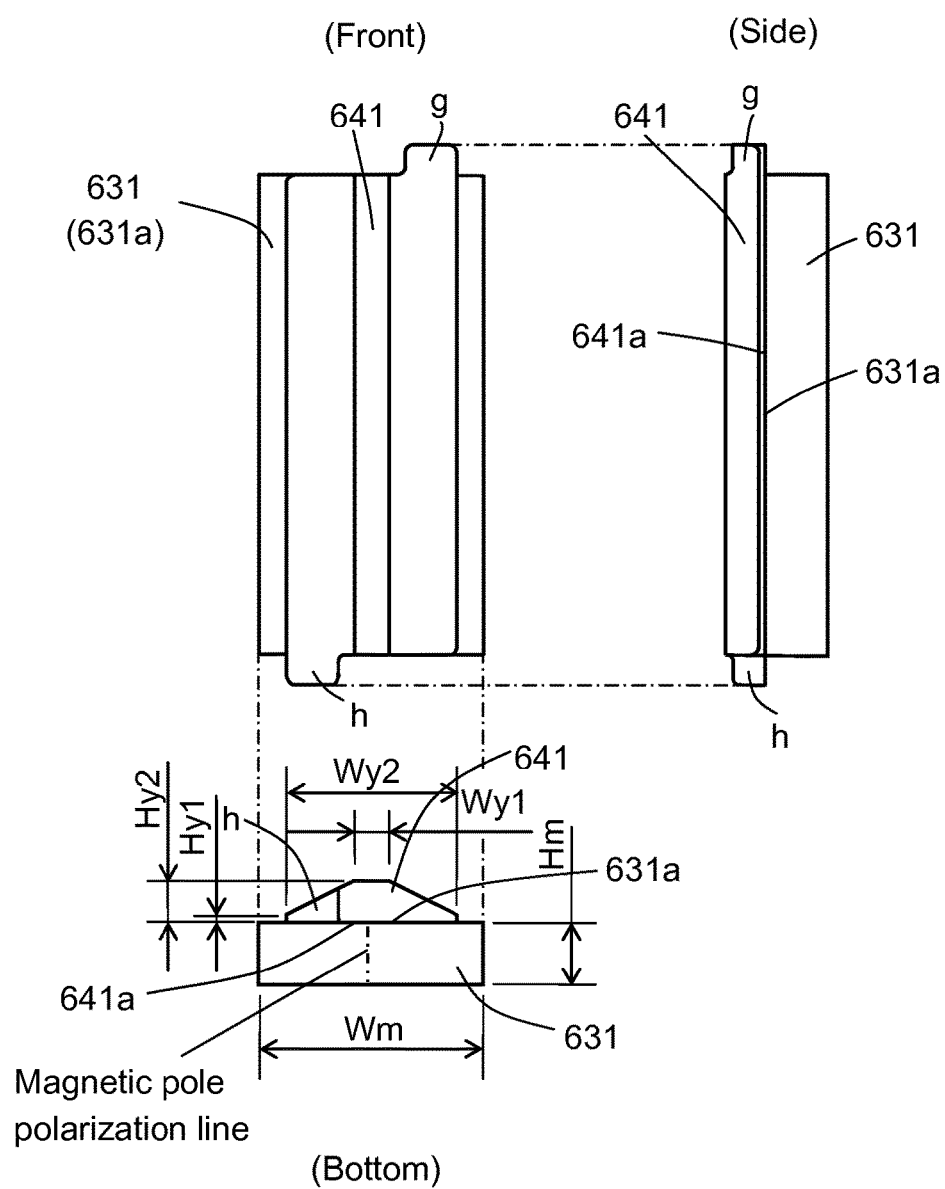
FIG. 5 is a diagram illustrating a configuration of yaw driving magnet 631 and yaw yoke 641 in the first exemplary embodiment.

FIG. 5 is a diagram illustrating a configuration of yaw driving magnet 631 and yaw yoke 641. Yaw driving magnet 631 and yaw yoke 641 contact each other at respective surfaces 631a and 641a. Yaw yoke 641 has protruded portions g and h for disposition to recess 623 of OIS frame 621.

As shown in a bottom view in FIG. 5, width Wy2 of surface 641a of yaw yoke 641 in contact with yaw driving magnet 631 and width Wm of surface 631a of yaw driving magnet 631 in contact with yaw yoke 641 satisfy the following condition.

$$Wm > Wy2$$

Thickness Hy2 near a center of yaw yoke 641 is formed to be gradually thinner in thickness to thickness Hy1 at edges. A location of a portion with a thicker thickness at and near the center agrees with a location of a magnetic pole polarization line of yaw driving magnet 631.

Even when mass of yaw yoke 641 is fixed, by forming yaw yoke 641 in such a shape, more magnetic flux can be extracted from yaw driving magnet 631 in the same shape.

[3. Comparison of Thrust]

FIGS. 6A to 6D are schematic diagrams illustrating comparison of actuator configurations. FIG. 6A is a case where yaw yoke 641 is not used. FIG. 6B is a case where yaw yoke 641 is formed in a rectangular parallelepiped shape, and width Wy of yaw yoke 641 is substantially equal to width Wm of yaw driving magnet 631. FIG. 6C is a case where yaw yoke 641 is formed in a rectangular parallelepiped shape, and width Wy of yaw yoke 641 is smaller than width Wm of yaw driving magnet 631 (Wm>Wy). FIG. 6D is a case where yaw yoke 641 with the cross-sectional shape shown in FIG. 4 is used. Here, a height of yaw driving magnet 631 in FIG. 6A is substantially equal to a total height of a height of yaw driving magnet 631 and a height of yaw yoke 641 in FIG. 6B. A sum of masses of yaw driving magnet 631 and yaw yoke 641 shown in FIGS. 6B, 6C, and 6D is substantially uniform.

FIG. 7 is a diagram illustrating relationships between the actuator configurations shown in FIGS. 6A to 6D and thrusts. Simulation results of magnetic field analyses of the actuators shown in FIGS. 6A to 6D correspond to items (A) to (D) shown in FIG. 7, respectively. Simulations are calculated on condition that a coil, an energizing condition, a coil-magnet gap, a magnet width, a magnet length, and a magnet+yoke mass are uniform. As shown in FIG. 7, thrust is the highest in the case of item (D) that corresponds to the cross-sectional shape of yaw yoke 641 shown in FIG. 4. Thrusts in the case of items (C) and (D) are higher than those in items (A) and (B) that are conventional examples. Specifically, as shown in FIG. 6C, by making width Wy of yaw yoke 641 narrower than width Wm of yaw driving magnet 631, thrust of the actuator is improved, compared to the conventional examples shown in FIGS. 6A and 6B.

Figure 8A:
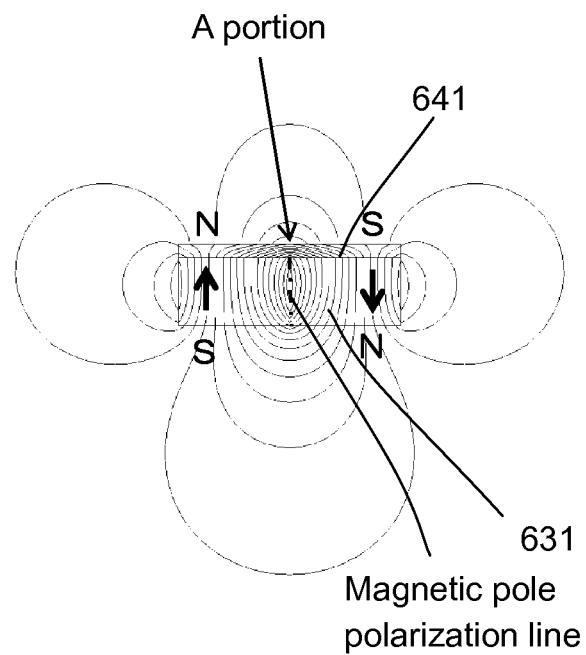
FIG. 8A is a schematic diagram illustrating simulation results of a magnetic field analysis for explaining a difference in magnetic fields due to a difference in yoke shapes (in a case of FIG. 6B)
Figure 8B:
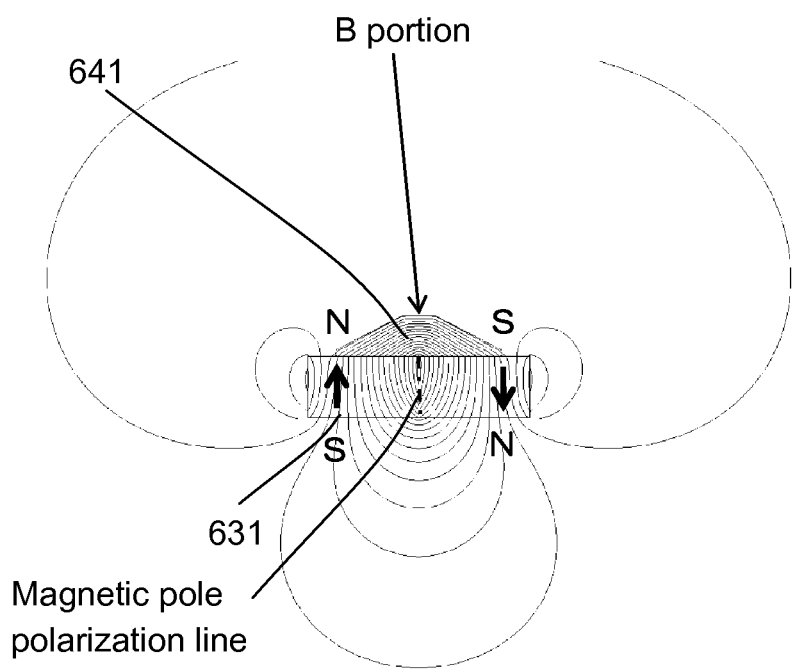
FIG. 8B is a schematic diagram illustrating simulation results of a magnetic field analysis for explaining a difference in magnetic fields due to a difference in yoke shapes (in a case of FIG. 6D)

FIGS. 8A and 8B are schematic diagrams illustrating simulation results of magnetic field analyses for explaining a difference in magnetic fields due to a difference in yoke shapes. FIG. 8A illustrates flows of magnetic flux when a yoke thickness is uniform, and corresponds to the example illustrated in FIG. 6B. FIG. 8B illustrates flows of magnetic flux with yoke 641 illustrated in FIG. 4 in the first exemplary embodiment, and corresponds to the example illustrated in FIG. 6D. In FIG. 8A, magnetic flux emitted from a magnet tries to pass through a yoke, but the magnetic flux concentrates around a magnetic pole polarization line, which shows that this portion tends to be magnetically saturated. Magnetic saturation occurs near an A portion in FIG. 8A, and magnetic flux leaks to a back side. On the other hand, in FIG. 8B, magnetic flux emitted from a magnet passes through a yoke, but a thick thickness around a magnetic pole polarization line causes the magnetic flux to be dispersed compared to the case in FIG. 8A, which shows that this portion tends not to be magnetically saturated. The magnetic flux hardly leaks near a B portion in FIG. 8B.

In order to correct an image blur at a higher precision, a greater force to move OIS unit 620, or when force is the same, a lighter mass of OIS unit 620 is more advantageous. In other words, an actuator with a greater thrust with respect to the same weight is more advantageous. Therefore, when thrust of an actuator has an allowance, by reducing a size of the actuator by that amount, an outside diameter of an image blur correction device can be reduced in size to reduce a diameter of a lens barrel.

Accordingly, by forming a yaw yoke as in the first exemplary embodiment, a lens barrel and a camera including the lens barrel can be reduced in size.

The first exemplary embodiment is an example of an image blur correction device of a digital camera, but by using a voice coil motor of the present disclosure, even when mass of a movable portion is the same, an actuator with a greater thrust can be designed, thus enabling mounting to various devices. Examples include an actuator for focus movement of a digital still camera, a magnetic disk device, and an actuator for head movement of an optical disk device. Mounting in these devices allows design of an actuator with a higher thrust and better response performance.

Figure 9:
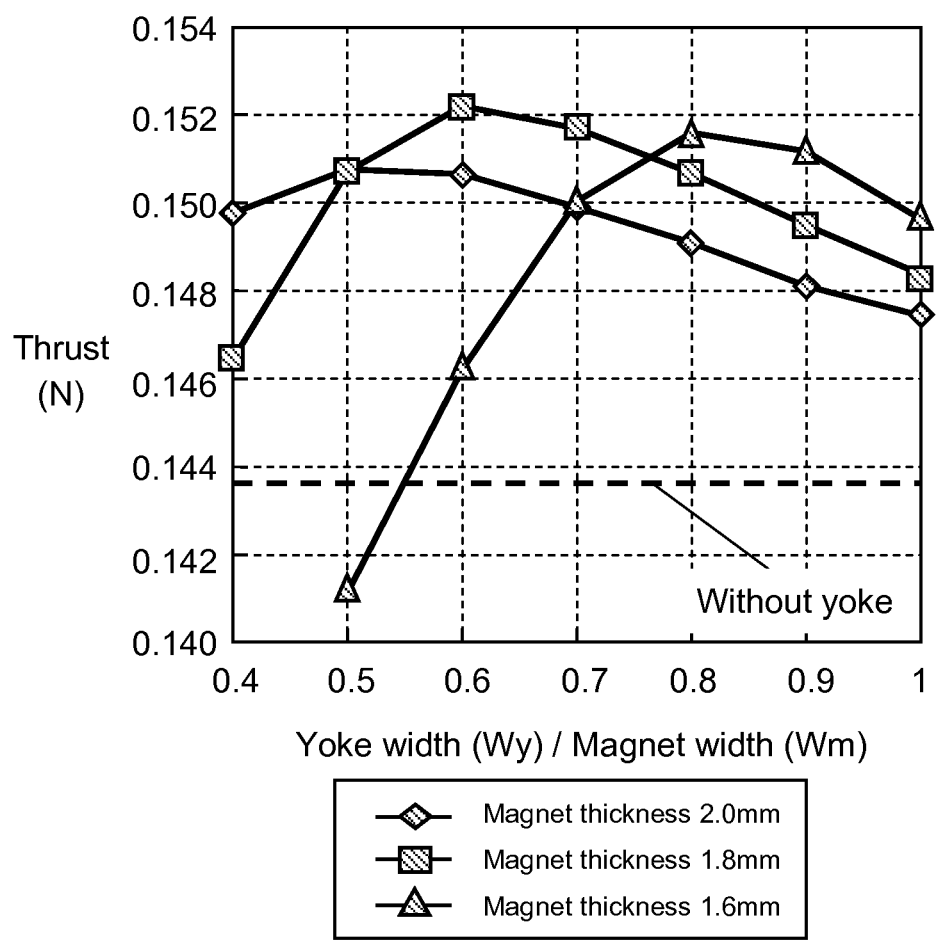
FIG. 9 is a graph illustrating thrusts when a yoke width, a magnet width, and a magnet thickness are changed.

FIG. 9 is a graph illustrating thrusts when a yoke width, a magnet width, and a magnet thickness are changed in the actuator configuration in FIG. 6C. As shown in FIG. 9, when width Wy of yaw yoke 641 is smaller than width Wm of yaw driving magnet 631, that is, yoke width (Wy)/magnet width (Wm) is less than one, there are portions where thrust is higher than thrust when yoke width (Wy)/magnet width (Wm) is 1. When the magnet thickness is 1.6 mm to 2.0 mm, thrust becomes high at yoke width (Wy)/magnet width (Wm) of about 0.7 to 0.9. When the magnet thickness is 1.8 mm to 2.0 mm, thrust becomes high at yoke width (Wy)/magnet width (Wm) of about 0.5 to 0.9. When the magnet thickness is 2.0 mm, thrust becomes high at yoke width (Wy)/magnet width (Wm) of about 0.4 to 0.9. This shows that even when a yoke width is made smaller than a magnet width, by increasing a thickness of a yoke near a polarization line where the yoke tends to be magnetically saturated, magnet performance is easily brought out.

Further, as shown in FIG. 9, by making the yoke width narrower than the magnet width, thrust can be increased with a thin magnet thickness. This shows that an amount of use of a magnet is reduced, compared to a conventional one. For a magnet, a rare metal such as neodymium or dysprosium is used. Reducing an amount of use of a magnet is effective in saving resources.

[4. Modifications]

Figure 10A:
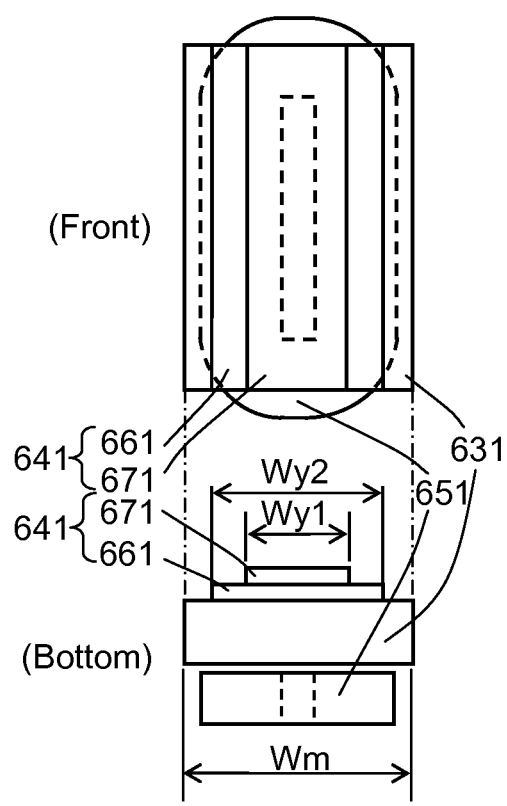
FIG. 10A is a schematic diagram illustrating a shape of yaw yoke 641 in a first modification.
Figure 10B:
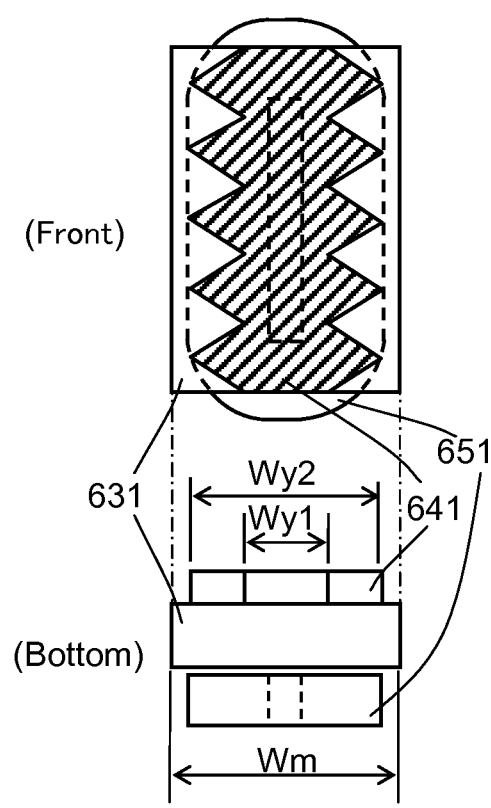
FIG. 10B is a schematic diagram illustrating a shape of yaw yoke 641 in a second modification.

Next, modifications of yaw yoke 641 will be described. FIG. 10A is a schematic diagram illustrating a shape of yaw yoke 641 in a first modification. FIG. 10B is a schematic diagram illustrating a shape of yaw yoke 641 in a second modification.

Yaw yoke 641 illustrated in FIG. 10A is configured with yoke 661 with a width of Wy2 and yoke 671 with a width of Wy1 being placed in layers. Width Wy2 of yoke 661 in contact with yaw driving magnet 631 is larger than width Wy1 of yoke 671 placed on yoke 661, and smaller than width Wm of yaw driving magnet 631. Thus, a thickness near a center of yaw yoke 641 is formed thicker. Like the shape of yaw yoke 641 shown in FIG. 6D, a shape in which a width of yaw yoke 641 becomes gradually smaller from oblique sides Wy2 to Wy1 and a thickness of yaw yoke 641 becomes gradually thicker from edges to a central area has a higher thrust. However, as shown in FIG. 10A, by placing a plurality of yokes with different widths in layers so that yaw yoke 641 is configured to have a thickness near a center thicker stepwise than an outer thickness, thrust can be improved compared to the case shown in FIG. 6C where the thickness of yaw yoke 641 is uniform. In FIG. 10A, yaw yoke 641 includes two yokes, but may be configured with three or more yokes.

FIG. 10B is an example in which outer peripheral sides of yaw yoke 641 are formed zigzag. Yaw yoke 641 shown in FIG. 10B has a shape in which thickness is uniform and a portion with width Wy2 and a portion with width Wy1 are repeated periodically in a longitudinal direction. Forming like this reduces a mass of yaw yoke 641 located at the outer peripheral sides than a mass near a center even though the thickness of yaw yoke 641 is uniform, and can improve thrust, as in the cases in FIGS. 6D and 10A where thickness on outer peripheral sides is reduced.

That is, when width Wy of yaw yoke 641 can be made narrower than width Wm of yaw driving magnet 631, and a thickness of yaw yoke 641 near a magnetic pole polarization line of a magnet can be made thicker than a thickness at outer peripheral sides, an actuator that brings out magnet performance and has a high thrust per equal mass can be configured.

(Other Embodiments)

As above, as an example of a technology disclosed in the present disclosure, the first exemplary embodiment has been described. However, the technology in the present disclosure is not limited to this, and is applicable to exemplary embodiments in which change, replacement, addition, omission, or the like is made as appropriate.

As above, as an example of the technology in the present disclosure, the first exemplary embodiment has been described. For that, the accompanying drawings and the detailed description have been provided.

Thus, components described in the accompanying drawings and the detailed description may include not only components essential to solve the problem, but also components inessential to solve the problem to illustrate the above technology. Therefore, those inessential components should not be recognized as essential directly because those inessential components are described in the accompanying drawings and the detailed description.

The above-described exemplary embodiment is intended to exemplarily illustrate the technology in the present disclosure, and thus various kinds of change, replacement, addition, omission, or the like may be made within the scope of the claims or the scope of their equivalence.

The present disclosure is applicable to an actuator having a coil and a magnet. In particular, the present disclosure is applicable to an image blur correction device such as one in which a magnet is placed on a movable member.

What is claimed is:

1. An actuator comprising:
    a magnetic field generating member including a multipole-magnetized magnet and a yoke attracted on a first surface of the multipole-magnetized magnet; and a coil member provided in a position confronting a second surface of the multipole-magnetized magnet; and a movable member configured to be relatively movable to the coil member in a direction perpendicular to a polarization line of multipole magnetization of the magnet, wherein a width of both ends of the yoke is narrower than the first surface of the multipole-magnetized magnet, and a recess, which is provided with the movable member and is formed on a surface confronting the coil member, holds directly the multipole-magnetized magnet on the first surface of the multipole-magnetized magnet and at outside of the both ends.

2. The actuator according to claim 1, wherein an axis of a winding for the coil member is parallel to the polarization line of multipole magnetization of the magnet.

3. The actuator according to claim 2, wherein the winding for the coil member is opposite to a pole of multipole magnetization of the magnet.

4. The actuator according to claim 1, wherein the yoke is thicker in a thickness direction at a portion corresponding to a polarization line of multipole magnetization of the magnet than at other portions.

5. A lens barrel comprising:

a magnetic field generating member including a multipole-magnetized magnet and a yoke attracted on a first surface of the multipole-magnetized magnet; and a coil member provided in a position confronting a second surface of the multipole-magnetized magnet; and a movable member to which a lens is fixed, configured to be relatively movable to the coil member in a direction perpendicular to a polarization line of multipole magnetization of the magnet, wherein a width of both ends of the yoke is narrower than the first surface of the multipole-magnetized magnet, and a recess, which is provided with the movable member and is formed on a surface confronting the coil member, holds directly the multipole-magnetized magnet on the first surface of the multipole-magnetized magnet and at outside of the both ends.

* * * * *